US009331751B2

(12) United States Patent  
Sikina et al.

(10) Patent No.: US 9,331,751 B2  
(45) Date of Patent: May 3, 2016

(54) METHOD AND SYSTEM FOR CHARACTERIZING AN ARRAY ANTENNA USING NEAR-FIELD MEASUREMENTS

(71) Applicant: Raytheon Company, Waltham, MA (US)

(72) Inventors: Thomas V. Sikina, Acton, MA (US); Jack J. Schuss, Newton, MA (US); Joseph E. Hilliard, Jr., Lawrence, MA (US)

(73) Assignee: Raytheon Company, Waltham, MA (US)

( * ) Notice: Subject to any disclaimer, the term of this patent is extended or adjusted under 35 U.S.C. 154(b) by 32 days.

(21) Appl. No.: 14/451,466

(22) Filed: Aug. 5, 2014

(65) Prior Publication Data

US 2016/0043778 A1 Feb. 11, 2016

(51) Int. Cl.  
*H04B 5/00* (2006.01)  
*G01D 18/00* (2006.01)

(52) U.S. Cl.  
CPC .............. *H04B 5/0043* (2013.01); *G01D 18/00* (2013.01)

(58) Field of Classification Search  
CPC ............................. H04B 5/0043; G01D 18/00  
USPC ............ 455/41.1, 67.12, 67.11, 226.1, 115.1, 455/115.2  
See application file for complete search history.

(56) References Cited

U.S. PATENT DOCUMENTS

| | | | | |
|---|---|---|---|---|
| 6,252,542 B1 * | 6/2001 | Sikina | ..................... | H01Q 3/267 342/174 |
| 6,750,379 B2 * | 6/2004 | McElroy | ............ | C12N 15/8213 800/260 |
| 6,771,216 B2 * | 8/2004 | Patel | ..................... | H01Q 3/267 342/174 |
| 6,897,829 B2 * | 5/2005 | Oliver | ...................... | H01Q 3/26 342/372 |
| 6,961,016 B1 * | 11/2005 | Pozgay | ................... | G01S 3/146 342/165 |
| 7,071,879 B2 * | 7/2006 | Strickland | .............. | H01Q 1/288 343/700 MS |
| 7,362,266 B2 * | 4/2008 | Collinson | .............. | H01Q 3/267 242/174 |
| 7,388,551 B2 * | 6/2008 | Guidon | ................ | H01Q 21/005 343/754 |
| 7,423,601 B2 * | 9/2008 | Brown | ...................... | H01Q 3/46 343/700 MS |
| 7,508,868 B2 * | 3/2009 | Chang | ................ | H04B 17/0087 375/224 |

(Continued)

FOREIGN PATENT DOCUMENTS

WO    WO 03/056349 A1    7/2003

OTHER PUBLICATIONS

PCT Search Report and Written Opinion of the ISA dated Sep. 1, 2015: for PCT Pat. App. No. PCT/US2015/034323; 14 pages.

*Primary Examiner* — Marceau Milord  
(74) *Attorney, Agent, or Firm* — Daly, Crowley, Mofford and Durkee, LLP

(57) ABSTRACT

Described embodiments calibrate an array antenna using near-field antenna measurements individually for each antenna element in an antenna under test (AUT). A signal is received at a first AUT antenna element from an antenna probe assembly by transmitting from the antenna probe assembly at each of multiple known probe locations in a near-field of the AUT. A signal is received at each probe location by transmitting from the first antenna element of the AUT to the antenna probe assembly. The received signals are combined into a combined signal for the first antenna element that de-correlates multi-path in the combination result. The combined signal is processed to generate a calibration coefficient for the first AUT antenna element. Remote boundary condition (RBC) testing is performed to reduce temporal instability. The multiple known probe locations lie on one of the following: a planar surface, a cylindrical surface, and a spherical surface.

29 Claims, 7 Drawing Sheets

(56) References Cited

U.S. PATENT DOCUMENTS

| | | | |
|---|---|---|---|
| 7,652,577 B1 * | 1/2010 | Madhow | G06K 7/10346 340/572.1 |
| 7,714,776 B2 * | 5/2010 | Cooper | H01Q 3/267 342/174 |
| 7,911,376 B2 * | 3/2011 | Hardacker | H01Q 3/267 342/174 |
| 7,928,906 B2 * | 4/2011 | Leather | H01Q 3/267 342/360 |
| 7,973,713 B2 * | 7/2011 | Gallagher | H01Q 3/26 342/373 |
| 8,004,456 B2 * | 8/2011 | Scott | H01Q 3/267 342/165 |
| 8,154,452 B2 * | 4/2012 | Webb | H01Q 3/267 342/174 |
| 8,331,869 B2 * | 12/2012 | Foegelle | H04B 17/0082 455/115.2 |
| 8,471,774 B2 * | 6/2013 | Oh | G01R 29/10 342/360 |
| 8,502,546 B2 * | 8/2013 | Nyshadham | G01R 29/0878 324/637 |
| 8,686,896 B2 * | 4/2014 | Schuman | G01S 7/4026 342/165 |
| 8,730,097 B1 * | 5/2014 | Uscinowicz | G01S 7/4017 342/165 |
| 8,750,354 B1 * | 6/2014 | Heruska | H04B 5/0025 375/224 |
| 8,786,440 B2 * | 7/2014 | Clare | G01S 13/82 340/572.1 |
| 8,818,291 B2 * | 8/2014 | Li | H01Q 3/267 342/174 |
| 9,014,635 B2 * | 4/2015 | Sadr | G06K 7/0008 340/10.1 |
| 9,094,056 B2 * | 7/2015 | Ouyang | H04B 5/0043 |
| 9,113,346 B2 * | 8/2015 | Pivit | H01Q 3/267 |
| 2006/0194553 A1 * | 8/2006 | Ozaki | G01R 29/10 455/226.1 |
| 2008/0056340 A1 | 3/2008 | Foegelle | |

* cited by examiner

METHOD AND SYSTEM FOR CHARACTERIZING AN ARRAY ANTENNA USING NEAR-FIELD MEASUREMENTS

BACKGROUND

An antenna is a transducer device that is operative for providing an interface between a wired circuit and a wireless propagation medium. As such, an antenna can be used as a transmit device to transmit signals to the wireless medium, as a receive device to receive signals from the wireless medium, or as a combination transmit/receive device to perform both of these functions. In many applications, an antenna will need to be appropriately characterized (e.g., calibrated, etc.) before transmit and/or receive operations are undertaken. Such characterizations may be performed before an antenna is deployed in the field and may also be performed periodically during the life of an antenna to compensate for error sources that change over time (e.g., circuit drift, etc.).

One type of antenna that is widely used is the array antenna. An array antenna typically includes a plurality of array elements that are located in fixed relation to one another. In some implementations, an array antenna may be made up of a plurality of identical or near identical radiating elements known as unit cells that are replicated throughout the array, although array antennas that include elements that are not technically unit cells also exist.

One popular technique for calibrating an array antenna involves the use of near-field measurements to deter nine calibration coefficients for the elements of the array. A point source probe antenna in the near-field of an array antenna under test (AUT) is sequentially positioned at each of the elements of the AUT. At each probe position, a test signal is transmitted to the corresponding antenna element of the AUT and a measurement is made at the element. A calibration coefficient is then generated for the array element based on the measurement. This process is repeated to generate calibration coefficients for all elements of the AUT. A problem that arises is that certain mechanisms within the near field region (e.g., scattering effects, multi-path, temporal instability, polarization isolation errors, etc.) can act as error sources that can compromise the accuracy of the measurements. Errors in the measurements can directly translate into errors in the calibration coefficients that are used to configure the antenna elements for use in the field To overcome problems related to reflections and multi-path in the near-field region, time domain processing techniques have been used to attempt to de-correlate the multipath. However, such techniques are often significantly limited by the operating bandwidth of the test array, which limits the time resolution. Similar RADAR processing techniques also have limited effectiveness for short range scattering, which is the dominant error component.

Techniques and systems are needed for improving the accuracy of near-field array antenna calibration.

SUMMARY

Techniques and systems for performing near-field array antenna calibration are described herein that are capable of significantly reducing negative effects of multipath and other error mechanisms in the near-field of an antenna under test. For individual elements of the AUT, measurements are made using signals from multiple different probe locations in the near-field. The measurements are then combined in a manner that de-correlates multipath and other error signals in the near-field.

In one possible approach, an array of probe elements may be provided in the near-field of an array under test that includes multiple probe elements positioned in fixed relation to one another. During a calibration procedure, the array of probe elements may be moved between a number of known positions associated with different elements of the AUT. When in a position associated with a particular antenna element of the AUT, test signals may be transmitted toward the antenna element one by one from the probe elements and corresponding measurements may be made and recorded at the antenna element. The measurements may then be combined in a manner that de-correlates the undesired scattering signals at a single frequency within the AUT's operating bandwidth. The result of the combination may subsequently be used to generate a calibration coefficient for the antenna element being tested. This process may be repeated for other (or all) elements within the AUT. The process may also be repeated for a fixed sampling of the needed set of calibration frequencies within the AUT's operating bandwidth. Likewise, it is repeated in all forms already indicated for each of the multiple polarizations used by the AUT during its normal operation.

In mother approach, a single probe element may be provided in the near field of the AUT. During a calibration procedure, the single probe element is moved to multiple different locations in the near-field of the AUT for each antenna element of the AUT tested. At each probe location, a test signal may be transmitted from the probe element to the antenna element of the AUT. Measurements may then be made and recorded at the antenna element for each of the probe locations. The measurements may then be combined as described above and the combination result may be used to generate a calibration coefficient for the antenna element of the AUT. While described above in the context of a receive mode where signals are transmitted from a probe and received at an AUT, it should be appreciated that techniques described herein may also be practiced using a transmit mode where signals are transmitted from AUT and are received at a probe.

Techniques described herein are expected to introduce a new degree of freedom to the near-field metrology field. By expanding the number of probe locations in a Cartesian coordinate frame for each AUT unit cell (or element) being calibrated or tested, and combining these measurement vectors in order to minimize multipath scattering errors, new levels of near-field metrology error may be achievable that are presently difficult to achieve otherwise.

In some embodiments, a combination of the above described approaches may be used. For example, for each antenna element in an AUT, a probe array may be moved between multiple locations in the new-field. At each location, a signal may be transmitted from each of the probe elements in the array, one by one, to the associated antenna element of the AUT. Measurements may then be made and recorded for each probe element in each of the probe array positions. The recorded measurements may then be combined in a manner that de-correlates multipath and other error sources. The combined signal may then be used to develop a calibration coefficient for the corresponding antenna element.

In accordance with one aspect of the concepts, systems, circuits, and techniques described herein, a method for calibrating an array antenna using near-field antenna measurements is provided. More specifically, the method comprises: for a first antenna element in an antenna under test (AUT), obtaining a received signal for each of multiple known probe locations in a near-field of the AUT; combining the received signals to generate a combined signal for the first antenna element, wherein combining the received signals includes combining the signal in a manner that de-correlates multipath in the combination result; and processing the combined signal to generate a calibration coefficient for the first AUT antenna element. Because of electromagnetic reciprocity, the method may be used in either a transmit mode or a receive mode to provide receive and transmit AUT calibration.

In one embodiment, obtaining a received signal for each of multiple known probe locations in a near-field of the AUT includes obtaining a measurement of a received signal; and combining the received signals to generate a combined signal for the first antenna element includes combining measurements of received signals in a virtual manner to generate a combined measurement.

In one embodiment, the method further comprises repeating obtaining, combining, and processing for other AUT antenna elements to generate calibration coefficients for the other AUT antenna elements.

In one embodiment, obtaining, combining, and processing are performed for a first calibration frequency within an operational bandwidth of the AUT; and the method further comprises repeating obtaining, combining, and processing for other calibration frequencies across an operational bandwidth of the AUT.

In one embodiment, obtaining, combining, and processing are performed for a first polarization state associated with the first AUT antenna element; and the method further comprises repeating obtaining, combining, and processing for at least one other polarization state associated with the first AUT antenna element.

In one embodiment, obtaining a received signal for each of multiple known probe locations in a near-field of the AUT includes transmitting test signals toward the AUT from the multiple known probe locations at different times and receiving signals at the first AUT antenna element for each of the transmitted test signals.

In one embodiment, transmitting test signals toward the AUT from multiple known probe locations includes transmitting test signals from a single probe element that is moved between the multiple known probe locations to form a virtual probe array.

In one embodiment, transmitting test signals toward the AUT from multiple known probe locations includes transmitting test signals from multiple probe elements within a probe array in the near-field of the AUT, each of the multiple probe elements being positioned at a corresponding one of the multiple known probe locations, wherein the test signals are transmitted from the multiple probe elements within the probe array one probe element at a time.

In one embodiment, transmitting test signals toward the AUT from multiple known probe locations includes transmitting the test signals from one or more probe elements associated with an antenna probe assembly in the near-field, wherein the antenna probe assembly is capable of movement within the near-field of the AUT.

In one embodiment, the antenna probe assembly includes multiple probe elements arranged in fixed relation to one another; and the method further comprises moving the multiple probe elements of the antenna probe assembly as a group to a new location in the near-field of the AUT before transmitting test signals to each new antenna element of the AUT that is tested.

In one embodiment, the antenna probe assembly includes a single probe element; and the method further comprises moving the single probe element of the antenna probe assembly to multiple different locations to generate a virtual probe array for each antenna element of the NUT that is tested.

In one embodiment, the multiple known probe locations associated with the first AUT antenna element all lie on one of the following a plane for planar near-field metrology, a cylindrical surface for cylindrical near-field metrology, and a spherical surface for spherical near-field metrology.

In one embodiment, obtaining a measurement for each of multiple known probe locations in a near-field of the AUT includes transmitting at least one test signal from the first AUT antenna element and measuring received signals at the multiple known probe locations.

In one embodiment, the method further comprises performing remote boundary condition (RBC) testing to reduce or eliminate temporal instability in the calibration test equipment used during the array calibration to isolate temporal instability within the AUT, wherein performing RBC testing includes inserting three boundary conditions, one at a time, at a specific point in the calibration test equipment and performing corresponding measurements to establish a phase reference.

In one embodiment, combining the measurements to generate a combined measurement for the first antenna element includes applying complex weights to the measurements so that the measurements align substantially in-phase at the first AUT antenna element.

In one embodiment, the multiple known probe locations associated with the first AUT antenna element are arranged in a probe array with any of multiple possible separation distances and lattices as needed in order to produce virtual scanned near-field beams at the AUT elements.

In one embodiment, the multiple known probe locations associated with the first AUT antenna element are achieved using an antenna probe assembly having a single or multiple probe elements that can be displaced to specific locations in three-dimensional cardinal space.

In one embodiment, combining the measurements to generate a combined measurement includes combining the measurements in a fixed hardware beamformer.

In one embodiment, combining is virtual since it occurs in the computational domain, after multiple sequential measurements associated with a given AUT unit cell, or multiples of these are complete.

In one embodiment, a single hardware combiner is used to replace the multiple measurements per AUT unit cell or element. In this manner, the multipath cancellation is integral to the probe equipment and is utilized as a mechanism to reduce the amount of time needed for data acquisition for AUT calibration. Such a low multipath assembly may be moved to each AUT unit cell or element in sequence.

In one embodiment, a fixed hardware beamformer to replace some or all of the virtual vector combination used. This approach may be used in order to minimize the time needed for data acquisition.

In one embodiment, the calibration process may be repeated for each AUT element tested for each of a number of calibration frequencies across an operational bandwidth of the AUT.

In one embodiment, the calibration process may be repeated for each of multiple different polarization states. The complete set of states may accurately characterize the polarization properties of the AUT, such that the scattering improvements indicated can also apply to polarization products and polarization isolation.

In one embodiment, the calibration process is performed in a manner that maximizes degrees of freedom and thus minimizes total combined scattering at the AUT unit cell.

In one embodiment, test signals are transmitted or received to/from the first AUT element or unit cell independent of the AUT unit cell arrangement or lattice, whether it be rectangular, triangular, Archimedes spiral, random, or of any fixed arrangement.

In accordance with another aspect of the concepts, systems, circuits, and techniques described herein, a system for characterizing an array antenna using near-field measurements is provided. More specifically, the system comprises: a mount to hold an antenna under test (AUT) during testing; an antenna probe assembly proximate to the mount, the antenna probe assembly being configured to hold one or more probe elements in now locations within a near-field of an AUT in the mount, wherein the antenna probe assembly is capable of controlled movement within the near-field of the AUT; at least one radio frequency (RF) signal source to provide test signals for transmission between the antenna probe assembly and the AUT during testing; and a controller coupled to the AUT, the antenna probe assembly, and the at least one RF signal source to perform near-field metrology for the AUT, wherein the controller is configured to: (i) cause one or more test signals to be transmitted between a first AUT antenna element and multiple known probe locations associated with the probe assembly; (ii) acquire measurements for the first AUT antenna element resulting from the one or more test signals, the measurements including one measurement for each of the multiple known probe locations; (iii) combine the measurements to generate a combined measurement for the first AUT antenna element, wherein the measurements are combined in a manner that decorrelates multipath signals in the combination result; and (iv) use the combined measurement to achieve a near-field metrology result for the AUT.

In one embodiment, the controller is configured to cause test signals to be transmitted from the multiple known probe locations to the first AUT antenna element one at a time; and the controller is configured to acquire measurements of resulting received signals at the first AUT antenna element.

In one embodiment, the controller is configured to cause the one or more test signals to be transmitted from the first AUT antenna element to the multiple known probe locations; and the controller is configured to acquire measurements of resulting received signals at the multiple known probe locations.

In one embodiment, the controller is configured to cause one or more test signals to be transmitted, acquire measurements, and combine the measurements for some or all of the AUT antenna elements, wherein a different set of probe locations is used for each AUT antenna element tested.

In one embodiment, the antenna probe assembly includes a probe array including multiple probe elements held in fixed relation to one another; and the controller is configured to move the multiple probe elements of the antenna probe assembly as a group to different positions for use with different AUT antenna elements.

In one embodiment, the antenna probe assembly includes a single probe element; and the controller is configured to move the single probe element between different locations for each AUT antenna element tested.

In one embodiment, the antenna probe assembly is configured to provide movement of the one or more probe elements within one of the following: a plane in the near-field of the AUT, a cylinder in the near-field of the AUT, and a sphere in the near-field of the AUT.

In one embodiment, the controller is configured to combine measurements associated with the first AUT antenna element by applying complex weights to the measurements so that the measurements align substantially in-phase at the first AUT antenna element and summing the weighted measurements.

In one embodiment, the controller is configured to dynamically adjust the number of probe locations and the complex weighting factors used to combine the measurements in a manner that minimizes the total scattered error vector magnitude for the multiple AUT antenna elements.

In one embodiment, the controller is configured to perform fax field pattern calculation for the AUT using near-field metrology.

In one embodiment, the controller is configured to calibrate the AUT using near-field metrology.

In one embodiment, the system further comprises a remote boundary condition (RBC) component to perform remote boundary condition testing to reduce or eliminate temporal instability in the test equipment during array calibration to isolate temporal instability within the AUT, wherein the RBC component is adapted to apply at least three boundary conditions, one at a time, at a specific point in the calibration test equipment to establish a phase reference.

In one embodiment, the AUT includes multiple parallel receive channels and the controller is configured to command some or all of the receive channels to receive in parallel to increase a number of receive AUT elements that can be processed from each probe position and reduce overall data acquisition time.

In one embodiment, the probe assembly has multiple parallel receive channels and the controller is configured to command some or all of the receive channels to receive in parallel to reduce overall data acquisition time at each probe position.

In one embodiment, the probe and its elements are configured to transmit or receive test signals to the first of all AUT unit cells from multiple probe locations as needed to maximize the degrees of freedom and so to minimize the total combined scattering at the AUT unit cell.

In one embodiment, the probe and its elements are configured to transmit or receive test signals to the first of all AUT unit cells, independent of the AUT unit cell arrangement or lattice, whether it be rectangular, triangular, Archimedes spiral, random, or of any fixed arrangement.

In one embodiment, the system is adapted for AUT calibration where the controller is configured to: cause one or more test signals to be transmitted from an AUT antenna element to multiple probe array locations, acquire measurements associated with signals received at the multiple probe array locations, and combine the measurements in a manner that causes essentially complete cancellation of the multipath signals in the combined AUT element measurement within the accuracy of the system, thus maximizing the potential benefit of the approach.

In accordance with a further aspect of the concepts, systems, circuits, and techniques described herein, a method for performing near-field antenna metrology is provided. More specifically, the method comprises: for as first antenna element in an antenna under test (AUT), obtaining a measurement for each of multiple known probe locations in a near-field of the AUT; combining the measurements to generate a combined measurement for the first antenna element, wherein combining the measurements includes combining the measurements in a manner that de-correlates multi-path signals in the combination result; and using the combined measurement to achieve a near-field metrology result for the AUT.

BRIEF DESCRIPTION OF THE DRAWINGS

The foregoing features may be more fully understood from the following description of the drawings in which.

DETAILED DESCRIPTION

As used herein, the phrases "antenna element," "radiating element," "unit cell," "element of the array," and "element of the AUT" each refer to elements within an array antenna under test. The phrases "probe," "probe element", "probe array," and the like each refer to an element or elements that are used in the near field of an AUT during near field testing to facilitate measurements associated with the AUT. Each of these may refer to a unit cell, which may measure 0.5 by 0.5 wavelengths in width and height, or it may equally refer to a subarray which may contain multiple unit cells, or it may refer to a super-element, containing multiple unit cells connected with a common transmission line and terminating in a single port.

Figure 1:
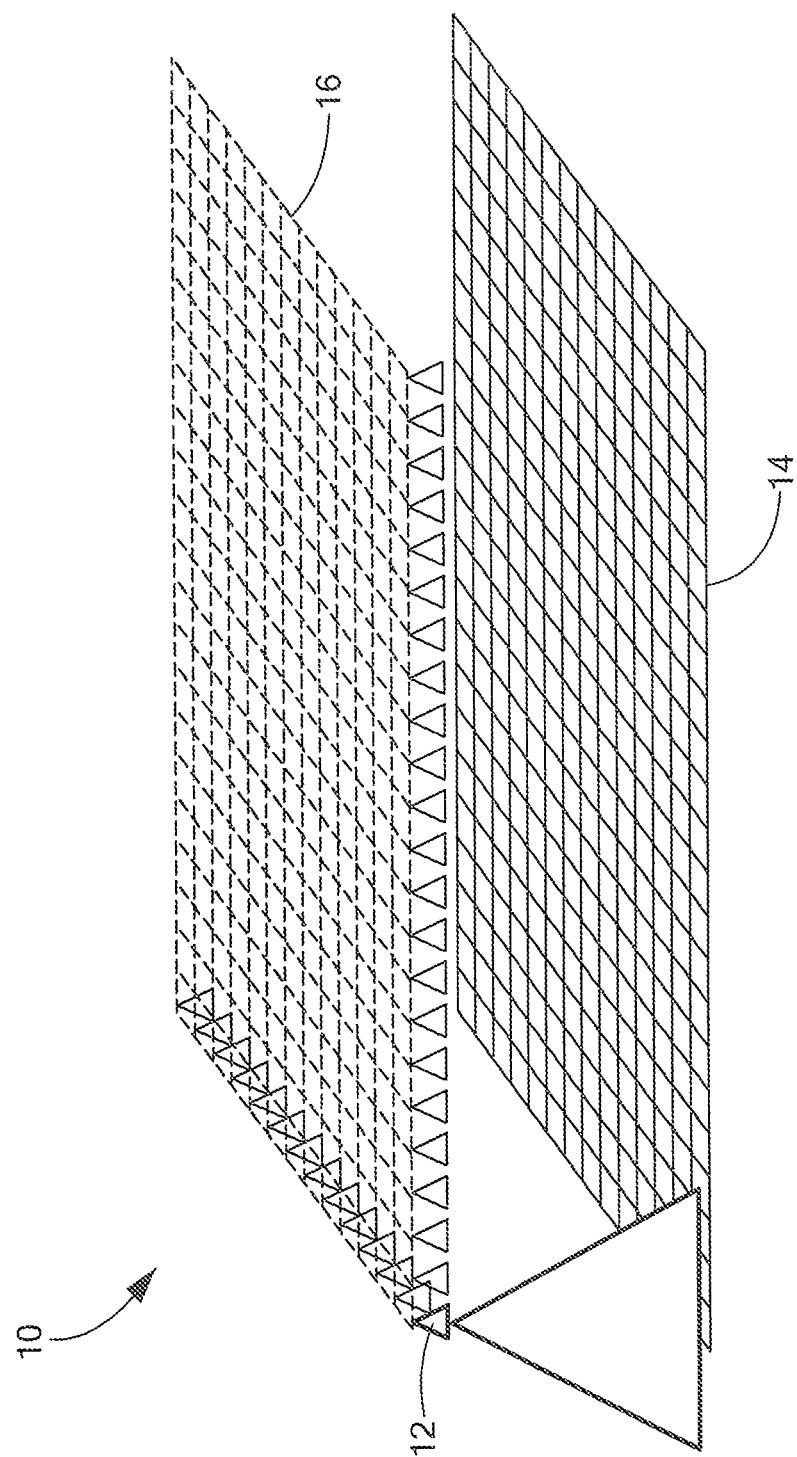
FIG. 1 is a diagram illustrating a conventional arrangement for use in calibrating an array antenna using planar near-field measurements.

FIG. 1 is a diagram illustrating a conventional arrangement 10 for use in calibrating an array antenna using near-field measurements. As shown, a calibration horn probe 12 is placed within a near-field of an antenna under test (AUT) 14, the latter's unit cells arranged in a square lattice for illustrative purposes. The probe 12 is positioned across from a first antenna element (or unit cell) of the AUT 14 at a separation of, for example, three wavelengths, and a test signal is transmitted to the element. The signal received at the first antenna element is then measured and recorded, and repeated for all calibration frequencies within the AUT's passband and all polarization states. The signal may subsequently be processed to generate a calibration coefficient for the antenna element. The probe 12 is then moved to a new position associated with another element of the AUT 14 and the process is repeated. This may be performed for each of the antenna elements within the AUT 14 to generate corresponding calibration coefficients. The calibration coefficients can then be used to configure the AUT to align the antenna elements therein to a known standard. One standard that is commonly used is the plane wave. When using this standard, the calibration coefficients are used to adjust the insertion vector of each element of the AUT to the same vector state (e.g., 0 dB, 0°) at specific calibration frequencies within an operating band. In one approach, the insertion vector may be adjusted by, for example, adjusting a variable phase shifter and a variable attenuator associated with the antenna element. In another approach, the insertion vector may be adjusted by, for example, appropriately setting a receiver/exciter insertion vector (i.e., digitally) associated with the antenna element. As will be appreciated, standards other than the plane wave standard may alternatively be used.

As illustrated in FIG. 1, during the calibration process, the probe 12 may be moved from position to position within a planar sampling grid 16 in the near-field of the AUT 14. Each position in the planar sampling grid 16 corresponds to an element in the AUT 14. The positions in the planar sampling grid 16 may, for example, be directly opposite the corresponding elements of the AUT 14. When the probe 12 transmits a signal to a particular element of the AUT 14, a measurement may be made at the antenna element, as described above. Based on the location of the probe, the coupling path between the probe 12 and the antenna element (i.e., the transfer function the path) is assumed to be known. The coupling path may thereafter be de-embedded from the measurement to generate the calibration coefficient for the array element.

The coupling path that is assumed to be known in the above process does not take into consideration various sources of error that can occur in the near-field region during testing. One such error mechanism relates to scattering effects in the near-field region. A signal transmitted from a probe 12 toward the AUT 14 may reflect (or scatter) off of portions of the AUT 14. The resulting scattered signal components can then again reflect off of other structures within the near-field region (e.g., portions of the probe assembly, etc.) or outside the near-field region back toward the AUT. Some of this energy can make its way to the antenna element of the AUT being tested (i.e., signal energy may reach the antenna element through multiple paths or multipath). This scattered energy will appear as an error vector in the signal received at the antenna element and the resulting measurements may be inaccurate. That is, scattering signals from the test array and other structures in the test environment can be received at the element of interest in addition to the desired signal and thus create errors in the calibration result (e.g., the coefficient, etc.). Reflections, scattering, and noise originating from outside the near-field region may also enter the near-field region and produce errors during the calibration process.

In one aspect of the processes, systems, and concepts described herein, a near-field array calibration technique is provided that transmits test signals from multiple different locations within the near-field of an AUT to an antenna element of the AUT. Measurements are then made at the AUT antenna element and the measurements are combined in a manner that de-correlates noise signals (e.g., scattering signals, multipath, etc) at the antenna element (in a virtual manner). In this way, a combined signal can be achieved that has a higher accuracy than would be possible using a single probe location. The dynamic range of the test equipment is designed to such an extent that the signal-to-noise ratio (SNR) of all measurements within their dynamic range yield an SNR of 20 dB or greater such that thermal noise is not a significant error contributor.

In one approach, the combination uses complex weights to focus the contributions from the multiple probe element locations. In the simplest sense, this means that the measurement associated with the propagation path length from each element is adjusted such that they all align in-phase (or substantially in-phase) at the selected AUT element. For example, two probe elements separated by 0.5 wavelengths and spaced at 14 wavelengths from the AUT will require a phase weighting of 3.2° in order to align to a central AUT unit cell. This also means that the signals associated with the scattered paths will arrive at the AUT element decorrelated, and as a result are decreased. For example, scattering dislocated by an additional distance of 12.7 wavelengths will be misaligned by 144°, causing destructive vector interference and a scattering reduction of 4.2 dB. This is analogous to a situation where an AUT element is located within the near-field main beam of the combined vector near-field radiation pattern, and the scattered signals fall within sidelobes of the pattern. However, the beam is a virtual beam as the underlying signals are measured at different times and are combined afterwards, so the near-field beam does not physically exist at any instant of time. By using multiple probe locations for individual antenna elements of the AUT, additional degrees of freedom are created during the calibration process that allows increased calibration accuracy to be achieved.

Figure 2:
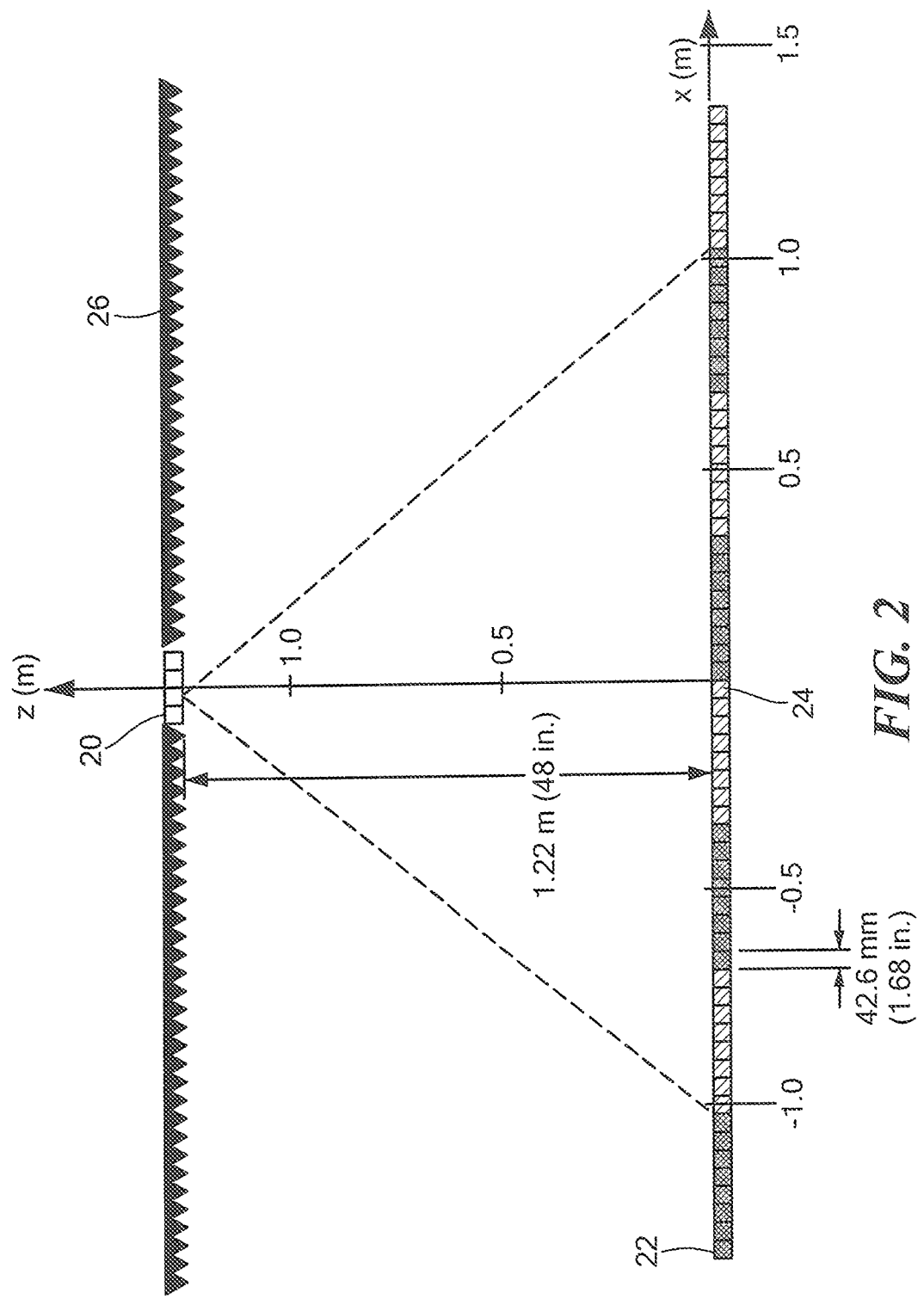
FIG. 2 is a side view of a near-field region of a planar antenna under test (AUT) illustrating a four element probe array that is used during an exemplary array calibration procedure in accordance with an embodiment.

FIG. 2 is a side view of a near-field region of an array antenna showing a four element probe array 20 being used to calibrate an AUT 23 consisting of a linear array having 64 unit cells in accordance with an embodiment. These radiators are each separated by approximately 0.5 wavelengths in the plane of the illustration, and may be 0.5 by 0.5 wavelength unit cells, or super-elements consisting of multiple unit cells extending in the plane perpendicular to the page. As shown, a radio frequency (RF) absorber material 26 may be positioned around the sides of the probe array 20 to reduce reflections in the near-field region that can result in multipath. The probe array 20 and the absorber material 26 may be part of a probe assembly that is capable of controlled motion within the near field region during the calibration process. In the illustrated embodiment, the controlled probe motion may be in a plane that is parallel to the plane of the elements within the AUT 22. During calibration, the probe array 20 may be moved between locations associated with the various elements of the AUT 22. As shown in FIG. 2, at some point in the calibration process, the probe array 20 may be moved to a location associated with antenna element 24 of the AUT 22. Test signals may then be transmitted from the probe elements one by one toward antenna element 24. Signal vectors may be measured and recorded for each of the transmitted test signals and at each of the calibration frequencies. For each probe element, a coupling path between the probe element and the antenna element 24 may be blown from prior simulation, prediction, or measurement, or assumed. Coupling path information may then be used as complex weights to weight the various measured signals for combination. The weighted signals may then be combined to form a combined signal with low error content. As described previously, the complex weighting is intended to generate vector signals that combine in phase at the corresponding antenna element. Any undesired signals (e.g., scattered paths, etc.) will arrive at the AUT element uncorrelated (e.g., of unaligned phase). For example, with 4 probe elements, simulations indicate that a 7.9 dB rms scattering reduction in a particular arrangement is expected. The combined signal may then be used to derive a calibration coefficient for the AUT element. This process may be repeated for some or all of the antenna elements (or unit cells) of the AUT 22, at all calibration frequencies and all relevant polarizations. The test vectors may be pulsed or Continuous Wave (CW), according to the needs of the AUT.

Figure 3:
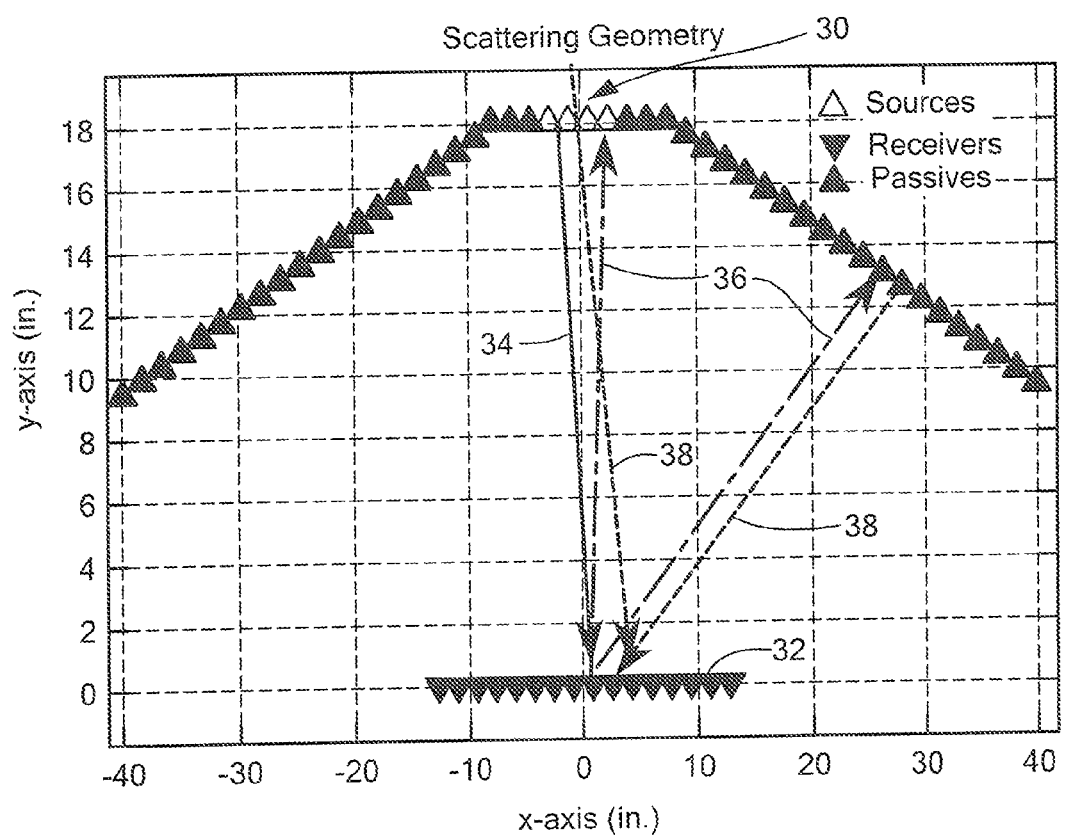
FIG. 3 is a diagram illustrating a scattering geometry that may exist within a near-field region of a planar array antenna during an antenna calibration procedure.

FIG. 3 is a diagram illustrating a scattering geometry that may exist within a near-field region of an array antenna during an antenna calibration procedure. As shown, a probe array 30 may be positioned opposite an AUT array 32 that is being calibrated. The elements of the probe array 30 may be surrounded by passive elements (e.g., RF absorber elements, etc.) to reduce reflections in the system. A test signal 34 is transmitted from one of the probe elements toward the array 32. The test signal scatters off of the array 32 to form first reflected fields 36. The first reflected fields propagate back toward the probe assembly where they may be reflected again to generate second reflected fields 38. As shown, the second reflected fields 38 may propagate back toward the array 32 where they can act to diminish the accuracy of the underlying measurement by introducing an error vector of unknown magnitude and phase at the calibration frequency. Although not shown, one or more signals may also be reflected from structures outside the near field region and back toward the antenna array 32, such as from the probe mechanism, the edges of the AUT, the anechoic environment where these tests are conducted, and from the test equipment. These reflected fields can also negatively affect the calibration in the same way by introducing additional error vectors. However, by appropriately combining signals from the multiple probe elements as described herein, this scattered path energy will be de-correlated at the antenna element of interest, thus reducing or eliminating errors caused thereby.

Figure 4:
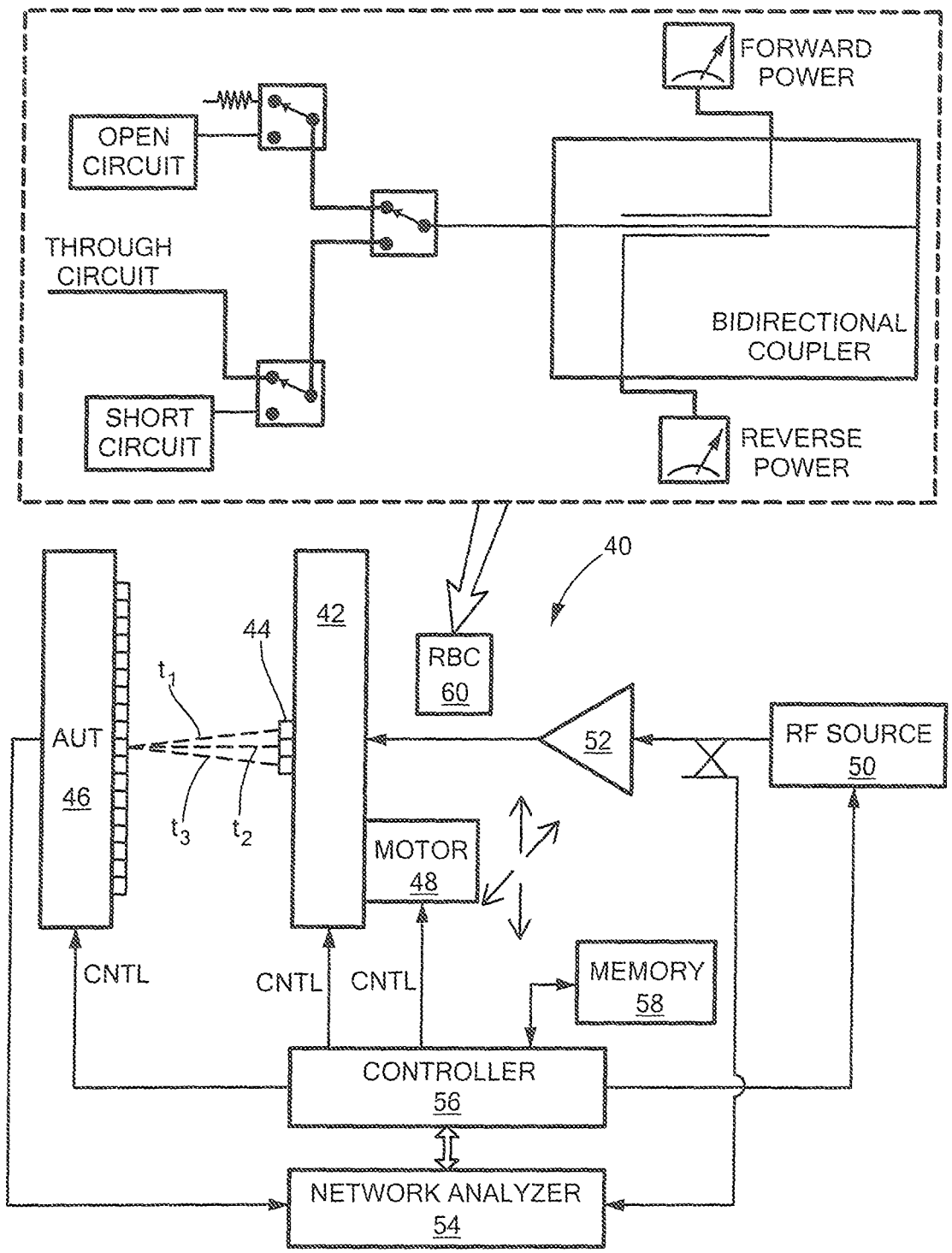
FIG. 4 is a block diagram illustrating an exemplary test setup that may be used to calibrate an array antenna using near-field measurements in accordance with an embodiment.

FIG. 4 is a block diagram illustrating an exemplary near-field test setup 40 that may be used to calibrate an array antenna in accordance with an embodiment. As shown, a probe assembly 42 is held in a near-field of an antenna under test (AUT) 46. The probe assembly 42 has a probe array 44 with multiple probe elements (e.g., three probe elements in the illustrated embodiment) that are held in fixed positions with respect to one another. The probe assembly 42 is able to move the probe array 44 within a plane, for example that is substantially parallel to a plane of the elements of the AUT 46. A motor 48 is provided to controllably reposition the probe assembly 42 during calibration testing, such that the Cartesian coordinates of the probe elements is known to a high accuracy. The motor 48 may include any type of machine, device, or system that can impart controlled motion to the probe assembly 42 and may be considered a part of the probe assembly 42. A radio frequency (RF) source 50 and an amplifier 52 may be provided to generate test signals to transmit from the probe elements to the AUT 46, the latter operating in Rx mode. Alternately, an RF receiver and Low Noise Amplifier (LNA) may provide the means to receive test signals transmitted from the AUT operating in Tx mode. A network analyzer 54 may be used to measure signals associated with the antenna elements of the AUT 46 during calibration processing. Other types of measurement equipment or devices may alternatively be used. A controller 56 may be provided to control the various components of the test setup 40 to implement a calibration test procedure. The controller 54 may be coupled to memory 58 for use in storing programs and/or data for use during calibration testing. Although not illustrated, the test set up 40 may also include a mount into which an AUT can be secured before a calibration test procedure is commenced. The mount can be located so that the AUT 46 is held in a desired position with respect to the probe assembly 42 during testing.

As described above, the controller 56 is operative for controlling the various elements of the test set up 40 during a calibration test procedure to perform an antenna calibration. For example, in one possible implementation, the controller 56 may be programmed to move the probe assembly 42 between a number of predetermined positions associated with positions of corresponding elements of the AUT 46. The controller 56 may, for example, deliver control signals to the motor 48 to effect this movement. When the probe assembly 44 is in as position associated with a desired antenna element of the AUT 46, the controller 56 may cause RF test signals to be transmitted by the probe elements one at a time toward the AUT 46. As shown in FIG. 4, the test signals may be transmitted at respective times $t_1$, $t_2$, and $t_3$. Although not shown, probe assembly 42 may include a switch to controllably couple an input RF test signal associated with amplifier 52 to a desired probe element for transmission. Other techniques for distributing test signals to the probe elements for transmission may alternatively be used (e.g., a separate RF signal source may be provided for each probe in some implementations, etc.).

Signals received by an antenna element of interest in the AUT 46 during testing are forwarded to the network analyzer 54 which measures the signal. The measurements made by the network analyzer 54 may be delivered to the controller 56 which stores them in memory 58 for later use. The network analyzer 54 may also monitor a signal at the output of the RF source 50 (or the amplifier 52) to have an indication of the timing and content of the transmitted signals. The network analyzer may generate one measurement for each test signal received by the antenna element of interest at a single calibration frequency and polarization state. In at least one embodiment, each measurement includes a vector, although other measurement formats may alternatively be used.

For each element of the AUT 46 that is tested, the controller 56 combines the corresponding measurements in a manner that reduces or eliminates scattered signals, multipath, and other noise from the combination result. In one possible approach, the controller 56 may assume a particular coupling path between each probe element of the probe array 44 and the corresponding AUT antenna element based on the known positions of the various elements during testing. This coupling path information may be pre-generated and stored within memory 58 in some embodiments. To combine the various measurements, the controller 56 may first process each measurement based on the corresponding coupling path information so that the resulting vectors all add in phase at the corresponding AUT antenna element. This may involve, for example, weighting the measurements using complex coefficients associated with the coupling paths, the mode of propagation, and the test frequency. Other techniques may alternatively be used. The weighted signals may then be combined using, for example, vector addition. In some implementations, the above-described technique may be repeated for all (or a subset) of the antenna elements in the AUT 46, at some or all of the calibration frequencies and polarization states.

The controller 56 may include any electronic device, component, or combination of devices and components that may be configured to perform one or more calibration test procedures described herein. In at least one embodiment, the controller 56 may include one or more programmable or reconfigurable digital processing devices. For example, the controller 56 may include one or more general purpose microprocessors, digital signal processors (DSPs), reduced instruction set computers (RISCs), complex instruction set computers (CISCs), field programmable gate arrays (FPGAs), application specific integrated circuits (ASICs), programmed logic arrays (PLAs), microcontrollers, embedded controllers, multi-core processors, processor complexes, and/or others, including combinations of the above. In some embodiments, the controller 54 may also, or alternatively, include one or more analog circuits. In various embodiments, techniques and systems described herein may be implemented using any combination of hardware, software, and firmware.

Memory 58 may include any type of device, system, structure, and/or tangible medium capable of storing digital data and/or instructions. Memory 58 may include, for example, one or more magnetic data storage devices, disc based storage devices, optical storage devices, semiconductor memories, read only memories (ROMs), random access memories (RAMs), non-volatile memories, flash memories, USB drives, compact disc read only memories (CD-ROMs), DVDs, Blu-Ray disks, magneto-optical disks, erasable programmable ROMs (EPROMs), electrically erasable programmable ROMs (EEPROMs), magnetic or optical cards, and/or others. In at least one embodiment, memory 58 may include as tangible non-transitory computer readable medium or media having instructions stored thereon for performing some or all of one or more calibration techniques, processes, or methods described herein.

The RBC 60 is shown as an instrument that may be inserted into the connection path between the probe array 44 and the amplifier 52, with separate, but unshown connections to the Network Analyzer 54. Its purpose is to establish an accurate time-vector reference plane at the probe elements 44. In the event of a temperature or time dependent drift in the RF equipment, the RBC provides an accurate reference to measure such a drift and provide virtual corrections. In one embodiment, the RBC may be implemented using RF short, open and load impedance standards, interfaced via a remotely controlled RF switch.

It should be appreciated that the test set up shown in FIG. 4 represents one possible test architecture that may be used to perform calibrations in accordance with principles and concepts described herein. Many alternative architectures and arrangements may be used as will be apparent to persons of skill in the art. Although illustrated with three probe elements in the probe array 44 of FIG. 4, it should be appreciated that the number of probe elements in a probe array can vary from implementation to implementation. In addition, although illustrated with the probe elements all aligned in a one dimensional line, it should be appreciated that two dimensional probe arrays may alternatively be used. In the illustrated test set up 40, the probe elements all move within a plane that is substantially parallel with a plane of the elements in the AUT 46. It should be understood, however, that the underlying principles and techniques may also be used within near-field test set ups that use cylindrical or spherical arrangements.

In the test set up of FIG. 4, a probe array is used to transmit test signals to an antenna element in an AUT from multiple different locations in the near-field of the array. In an alternative approach, a single probe element may be used that is moved between multiple different positions for each of the antenna elements of the AUT that is tested. At each new position, a test signal may be transmitted from the single probe element toward the AUT and a corresponding measurement may be made. The test process and the results of that process would otherwise be similar to those described above.

Figure 5:
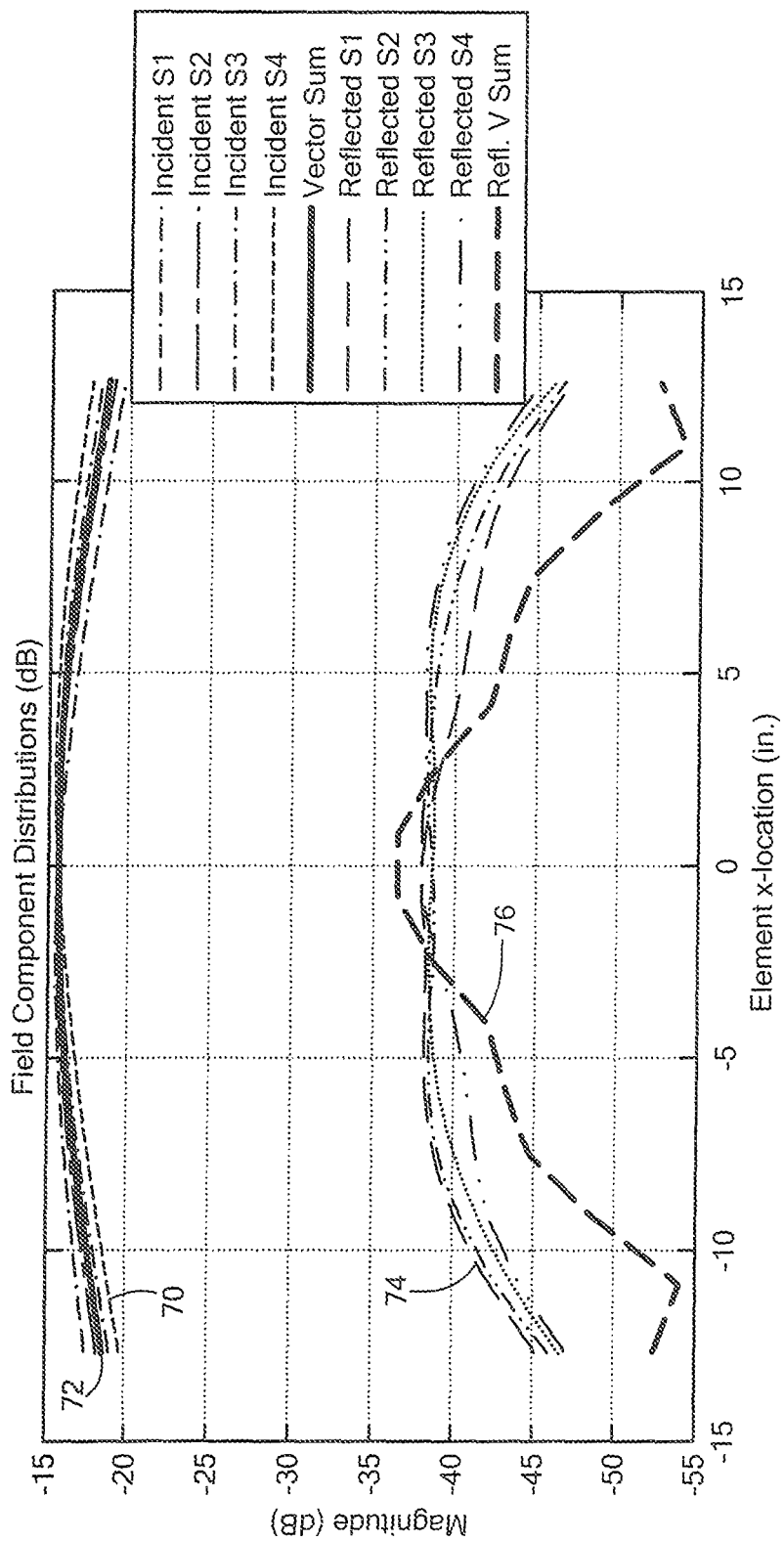
FIG. 5 is a plot showing scattered field magnitude versus location and a corresponding vector sum for an exemplary system having four source elements in accordance with an embodiment.

FIG. 5 is a plot illustrating scattered field magnitude versus position f in a system using four source elements (or probes) in accordance with an embodiment. The plot also shows the vector sum of the scattered fields. The y-axis of the plot represents signal magnitude in deciBels (dB) and the x-axis represents AUT location in inches. At the top of the plot, the incident field components 70 are shown for the four sources as well as their vector sum 72. The vector sum curve has a magnitude comparable to each of the individual samples, due to normalization. At the bottom of the plot, the corresponding scattered signals 74 are shown for each of the probe elements, along with their sum 76. These individual scattered signals are each relatively small in comparison to the direct signal magnitudes, but they represent a −29.4 dB rms error, equivalent to an accuracy of 0.30 dB, 2.0° rms. As illustrated, the scattered signals 74 are relatively broad in the x-dimension, while the combined signal 76 is narrower and drops off significantly toward the outer edges. Moreover, the vector sum shows an appreciable reduction in the scattered signals 76, while the incident signal shows relatively little change, illustrating the scattered field reductions possible with as 4-element probe array. The effect is more pronounced for AUT elements located furthest from the probe center. The combined scattered field also reduces in proportion to the number N of probe elements by a voltage ratio of 1/N. Thus the 4 element probe array generates approximately 79 dB of scattered field reduction, particularly at a 10 inch displacement from the probe center. This results in an equivalent error reduced to −37.3 dB, for an improved accuracy of 0.12 dB, 0.8° rms.

Figure 6A:
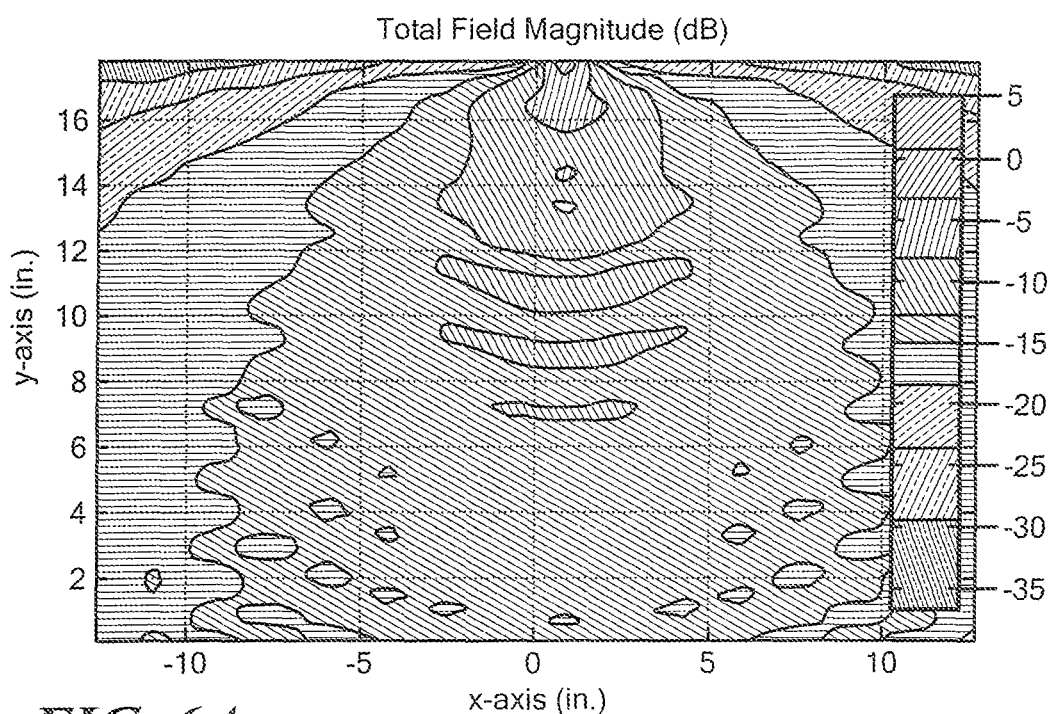
FIG. 6A is a plot showing total field magnitude versus location for an exemplary near field antenna array calibration test procedure using a single probe location.
Figure 6B:
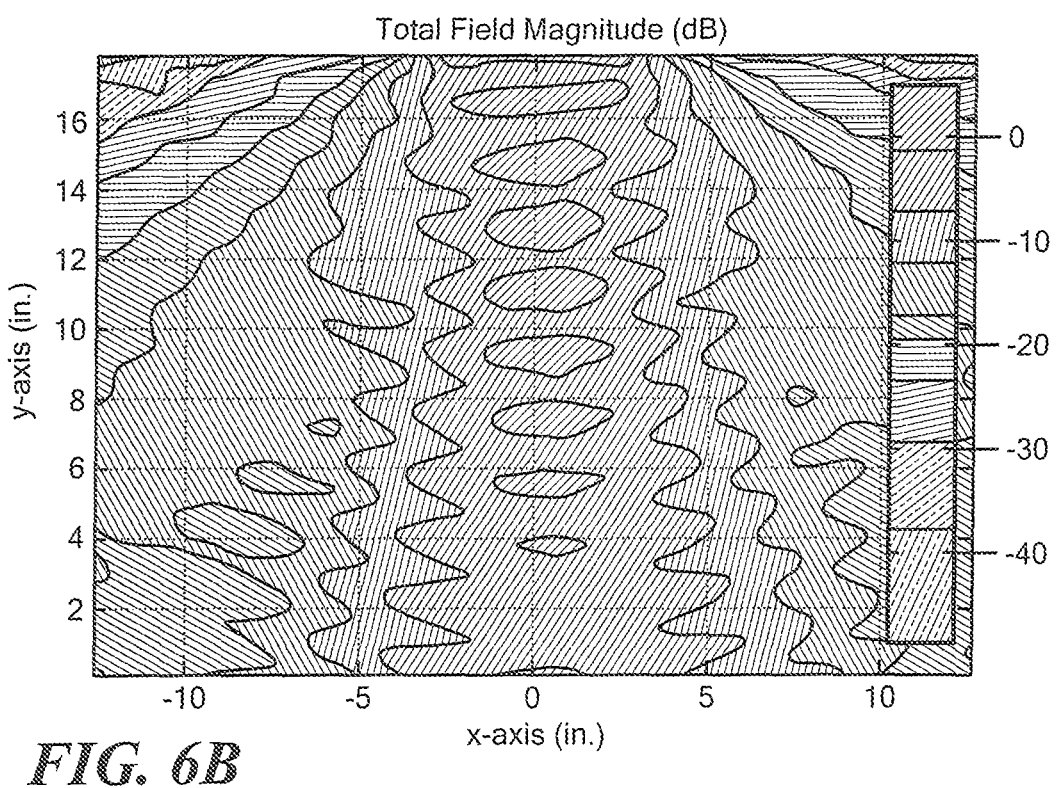
FIG. 6B is a plot showing total field magnitude versus location for an exemplary near-field calibration test procedure for a system having four source elements per AUT array element in accordance with an embodiment.

FIGS. 6A and 6B are plots showing how the total field magnitude associated with a near-field array calibration test procedure can be enhanced using techniques, systems, and concepts described herein. FIG. 6A shows total radiated field for a calibration procedure using a single source probe in a single location, as is typical of conventional near-field calibration methods. FIG. 6B shows the total radiated field for a calibration procedure using multiple probe positions. As shown, the radiated fields are much more focused and much higher intensity when the virtual array idea is implemented. As discussed previously, this fact can provide significant improvement in overall calibration accuracy, since the intended or incident fields add constructively at the intended AUT element and scattered fields decorrelate at that location. The conventional single-element field is fixed and distorted by scattering, while the combined probe field can be focused on each of the AUT elements as needed by scanning the virtual beam. The ripples seen in both plots are illustrative of a typical scattering environment. Where reflections from the probe, AUT, and surrounding structures introduce scattered fields that add with the more dominant incident fields. This addition causes the total field to rise to local maximums where incident and reflected fields add in-phase, and to minimums where they fall out-of-phase.

Figure 7:
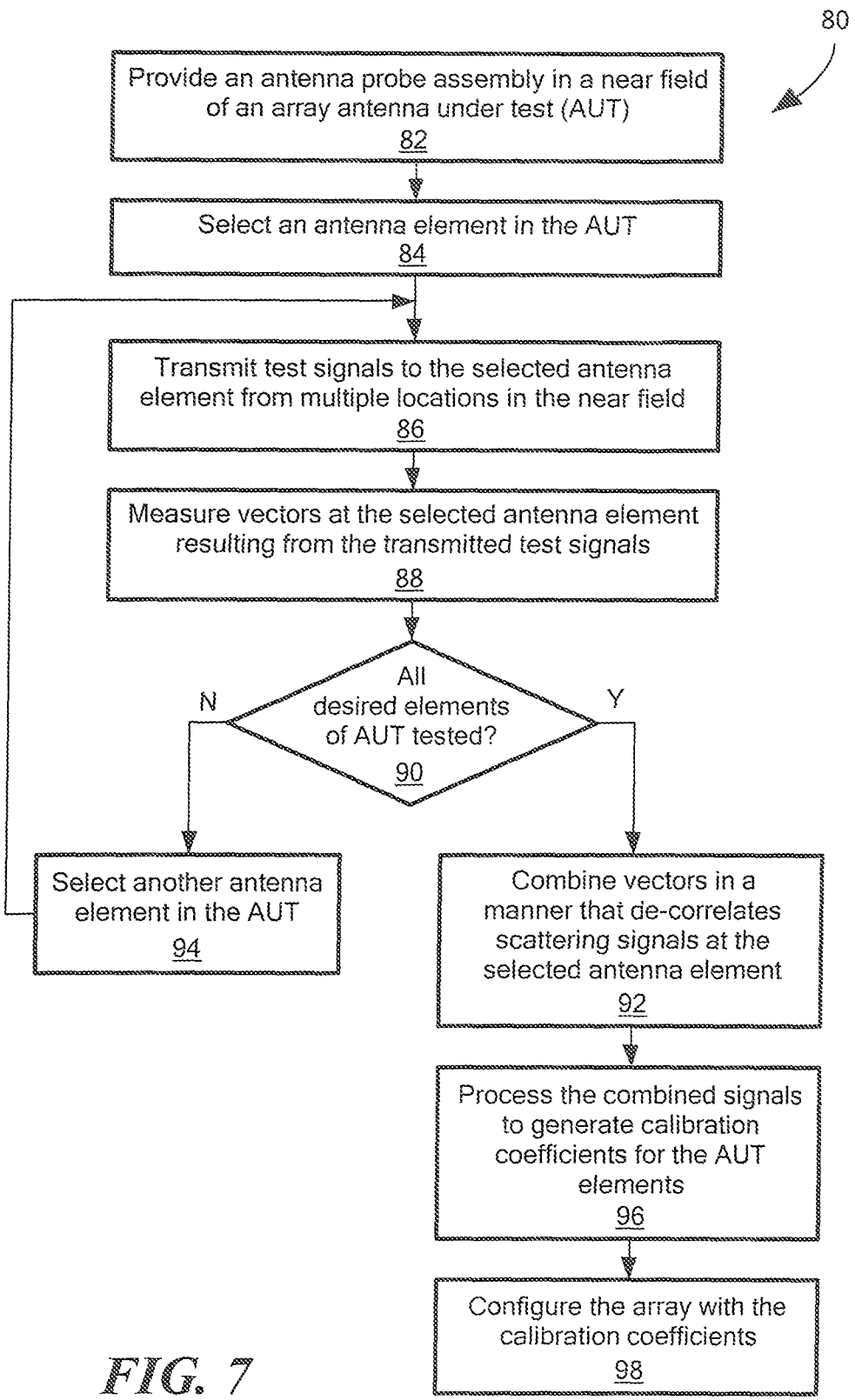
FIG. 7 is a flowchart illustrating an exemplary method for performing near-field antenna array calibration in accordance with an embodiment.

FIG. 7 is a flowchart illustrating as method 80 for performing near-field array antenna calibration in accordance with an embodiment. Although the specific actions shown in the flowchart follow a definite order, it should be appreciated that variations may be made without departing from the spirit and scope of the underlying concepts, as persons of ordinary skill in the art will readily understand. For example, in some embodiments, the actions may be performed in a different order. In other embodiments, one or more of the actions may be optional or modified. The method 80 may be implemented, for example, in the calibration test set up 40 of FIG. 4 or in other near-field test systems. In some implementations, the method 80 or variations thereof may be fully or partially embodied as instructions and/or configuration data stored on as tangible computer readable medium or media that can be executed by a computing device or system. As used herein, the phrases "tangible computer readable medium," "tangible machine readable medium," and the like are not intended to encompass transitory signals per se, but do cover tangible storage mediums that store data and/or instructions in a temporary form (e.g., volatile memory RAM, etc.).

Referring now to FIG. 7, an antenna probe assembly is first provided in a near-field of an antenna under test (AUT) (block 82). An antenna element in the AUT is selected for processing (block 84). Test signals are transmitted to the selected antenna element of the AUT from multiple different locations in the near-field (block 86) for Rx AUT calibration and in a similar manner for Tx calibration. The multiple locations may be locations associated with the probe assembly. For example, in one approach, as probe array may be provided on the probe assembly that includes multiple probe elements held in fixed relation to one another. The probe array may be moved to a location associated with the selected antenna element and signals may be transmitted to the selected element one by one by the probe elements in the probe array. In another approach a single probe element may be moved between multiple known locations associated with the selected antenna element and a test signal may be transmitted from each location. Other techniques for transmitting test signals to the selected antenna element from multiple known locations in the near-field may alternatively be used.

In some implementations, the multiple near-field locations used to transmit signals to the AUT for an antenna element may all lie within a common plane (e.g., in a planar near-field system). In other implementations, the multiple near-field locations may all lie on a cylinder or sphere (e.g., in a cylindrical or spherical near-field system). In still other implementations, the multiple near field locations may not be limited to a specific shape or coordinate system.

After a test signal has been transmitted to the selected antenna element from a near-field location, a measurement may be made at the antenna element (block 88). Such measurements may be made for each test signal transmitted. In some embodiments, this may be repeated for the selected antenna element for one or more additional calibration frequencies and/or one or more additional AUT polarization modes. It may next be determined whether all desired elements of the AUT have been tested (block 90). If not, another element is selected (block 94) and the process is repeated starting at block 86 for the new selected antenna element. Each time a new element is tested, a probe assembly may be moved to place one or more probe elements in corresponding locations in the near field of the AUT. If the probe assembly has an array of probe elements, the assembly may only have to be moved once per antenna element tested. If the probe assembly has a single probe element, the assembly will have to be moved multiple times per antenna element tested. This process may then be repeated for each of the antenna elements to be tested (which may be some or all of the elements in the AUT).

After all desired AUT elements have been tested, the measurements associated with each AUT element may be appropriately combined in a manner that de-correlates scattering signals in the combination result (block 92). If multiple frequencies and/or polarization states are tested for each AUT antenna, a separate combination may be made for each grouping of antenna, frequency, and polarization state. In one possible approach, complex weights may be applied to the measurements as part of the combination process. The complex weights may be selected based on known coupling paths associated with the multiple near-field probe locations. After weighting, the weighted measurements may be combined using, for example, vector addition to generate a combined signal with reduced error.

At some point in the method 80, the combined signal for each antenna element (and frequency and/or polarization state) may be used to generate calibration information for the element (block 96). The calibration information may then be used to configure the NUT in accordance with a known standard (e.g., a plane wave standard, etc.). In one possible approach, calibration coefficients associated with antenna elements of the AUT may be used to configure a variable phase shifter and a variable attenuator associated with each element. In another approach, calibration coefficients associated with antenna elements of the AUT may be used to set a receiver/exciter insertion vector associated with each corresponding antenna element. Other techniques are also possible.

It should be appreciated that the above method may be modified to perform calibration where the AUT elements transmit and the probe elements receive. If this approach is taken, and the probe assembly uses multiple probe elements, than a fixed hardware beamformer may be made part of the probe assembly to perform the required combinations. As will be appreciated, this technique can significantly reduce data acquisition time during calibration.

In embodiments described above, multiple probe locations are used to perform near field measurements for an AUT to develop, for example, calibration information for the AUT. Multiple measurements may then be combined in a manner that decorrelates multi-path components at a corresponding antenna element of the AUT. In some implementations, calibrations are also performed for the one or more probe elements that are used during the calibration of the AUT. The probe calibrations may be performed, for example, before the antenna element calibrations are undertaken. Any of a variety of different techniques may be used to calibrate the probe elements in different implementations.

Beyond the errors introduced by scattering, additional errors may stem from temporal instability in general. Temporal instability refers to the time dependent drift of the calibration equipment and the AUT itself. In addition, the scattering can become time dependent, but because of the temperature control used in modern near-field test ranges, this latter source of error is generally small. However, this is not the case for the test equipment. A method is desirable for separating the calibration system temporal instability from that of the AUT and to control it.

One of the best ways to control temporal instability, in general, is to establish an accurate time or phase reference. Consider the simple case of a standard RF cable used between a signal source and a radiating antenna, and assume that this arrangement is used to establish a source signal that can propagate through a given AUT unit cell. It is known that the insertion phase of the test cable and the AUT both change slowly as a function of time, since both are sensitive to small temperature changes. It is desirable to separate the test cable insertion phase changes from that of the AUT unit cell chain, so that the AUT unit cell's time and phase reference can be established. If a unit cell's insertion phase change with respect to time from a reference time ($t_0$) is known, one can elect to adjust it by means of its phase shifter when its drift has exceeded a determined threshold. When the drift is less than this threshold, there is no need to introduce a correction, since its impact on the AUT total error is sufficiently small. In order to make this adjustment, it can be important to isolate the test equipment time dependent drift from that of the array. This isolation can be done using a Remote Boundary Condition (RBC) device.

The RBC establishes a known phase reference at $t_0$ using three impedance boundary conditions. This is equivalent to one of the best known Network Analyzer calibration methods. At a given reference plane (e.g., the end of our example RF cable), the RBC inserts the three boundary conditions of open circuit, short circuit, and load, and makes standard S-parameter measurements. These three boundary conditions are equivalent to reflection coefficient extremes of 1.0, −1.0, and nominally 0.0, respectively. These allow the determination of an accurate insertion phase reference at the location in the RF cable where they are inserted, using standard transmission line equations. The RBC allows this at any time, using the same measurement equipment, so by its use, the drift of the cables insertion phase as a function of time can be determined. By embedding these RBC measurements within the calibration test sequence, the same procedure of introducing virtual insertion phase adjustments whenever the drift exceeds a predetermined threshold can be applied. This effectively controls the cables's insertion phase instability, giving us the stabilized RF source used to calibrate the AUT unit cells in the time domain. The RBC method may similarly be used to provide a stable RF source for near-field calibration. This means that the RBC measurements may be embedded within the described calibration measurements in order to ensure that the RF source remains stable during the near-field measurement process. As shown in FIG. 4, an optional RBC device 60 may be used within the test set up 40 in some implementations to deal with temporal instability in the test equipment.

Some alternative (or additional) phase stability methods that may be used include temperature control, the use of phase stable cable, and measures to stabilize the test equipment. Accurate temperature control is useful, since it reduces the thermal variation, which is a major contributor to insertion phase instability. Although helpful, this does not eliminate the phase instability. Phase stable cable also reduces the cable's phase instability, but does not eliminate it. The test equipment can be calibrated daily, and allowed to reach thermal stability before the measurements start. However, while all of these measures reduce the magnitude of the temporal instability, none of them eliminate it entirely.

In the description above, certain concepts and techniques are discussed in the context of array antenna calibration. It should be appreciated that one or more of these concepts may be extended for use in applications other than array calibration. In fact, concepts and techniques described herein have application in all forms of near field metrology (including those involving holographic transforms). In one possible application, for example, techniques described herein are used to improve the accuracy of far field pattern calculation for an array antenna using near-field measurements. In a typical implementation, far field patterns are calculated from near-field measurements using Fourier transform techniques. When near-field measurements are used to generate far field patterns, scattering effects can reduce the accuracy of the near-field measurements, and therefore also reduce the accuracy of the far field patterns derived from them. That is, the scattered signals can be received at one or more elements and act as errors in the underlying measurements. In a far field pattern implementation, elements in the AUT may act as sources and elements of the probe array may act as receivers. A signal transmitted from an element of the AUT may be received at multiple different probe elements of the probe array. The received signals may then be combined in a manner that reduces scattered signals in the combined result. This may be thought of as generating a virtual receive beam for the probe array that is focused in the direction of the source element of the AUT.

As is well known, modern manufacturing processes rarely produce perfect structural features. For example, a rectangular structure is rarely, if ever, perfectly rectangular and a planar surface is rarely, if ever, perfectly planar. That is, there is typically a normal range of variation in a structural feature that is associated with an underlying fabrication process. As used herein, the word "substantially" is intended to have its ordinary and customary meaning to denote approximation. Thus, when used to modify a specific structural feature or parameter, the term "substantially" means an approximation, of the feature or parameter that will at least encompass a normal range of variation. In other words, the term "substantially" is being used as a descriptive term to avoid a strict numerical boundary for the corresponding feature or parameter.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method for calibrating an array antenna using near-field antenna measurements, the method comprising:
for a first antenna element in an antenna under test (AUT):
obtaining a received signal at the first AUT antenna element from an antenna probe assembly comprising multiple probe elements, by transmitting from the antenna probe assembly at each of multiple known probe locations in a near-field of the AUT;
obtaining a received signal at each the multiple known probe locations by transmitting from the first AUT antenna element to the antenna probe assembly at each of the multiple known probe locations;
combining the received signals to generate a combined signal for the first antenna element, wherein combining the received signals includes combining the signal in a manner that de-correlates multi-path in the combination result;
processing the combined signal to generate a calibration coefficient for the first AUT antenna element; and
performing remote boundary condition (RBC) testing to reduce or eliminate temporal instability in the calibration test equipment used during the array calibration to isolate temporal instability within the AUT, wherein performing RBC testing includes inserting first, second and third boundary conditions, one at a time, at a specific point in the calibration test equipment and performing corresponding measurements to establish a phase reference,
wherein the multiple known probe locations associated with the first AUT antenna element lie on one of the following: a plane for planar near-field metrology, a cylindrical surface for cylindrical near-field metrology, and a spherical surface for spherical near-field metrology.

2. The method of claim 1, wherein:
obtaining a received signal for each of multiple known probe locations in a near-field of the AUT includes obtaining a measurement of a received signal; and
combining the received signals to generate a combined signal for the first antenna element includes combining measurements of received signals in a virtual manner to generate a combined measurement.

3. The method of claim 1, further comprising:
repeating obtaining, combining, and processing for other AUT antenna elements to generate calibration coefficients for the other AUT antenna elements.

4. The method of claim 1, wherein:
obtaining, combining, and processing are performed for a first calibration frequency within an operational bandwidth of the AUT; and
the method further comprises repeating obtaining, combining, and processing for the first AUT antenna element for other calibration frequencies across an operational bandwidth of the AUT.

5. The method of claim 1, wherein:
obtaining, combining, and processing are performed for a first polarization state associated with the first AUT antenna element; and
the method further comprises repeating obtaining, combining, and processing for at least one other polarization state associated with the first AUT antenna element.

6. The method of claim 1, wherein:
obtaining a received signal for each of multiple known probe locations in a near-field of the AUT includes transmitting test signals toward the AUT from the multiple known probe locations at different times and receiving a signal at the first AUT antenna element for each of the transmitted test signals.

7. The method of claim 6, wherein:
transmitting test signals toward the AUT from multiple known probe locations includes transmitting test signals from a single probe element that is moved between the multiple known probe locations to form a virtual probe array.

8. The method of claim 6, wherein:
transmitting test signals toward the AUT from multiple known probe locations includes transmitting test signals from multiple probe elements within a probe array in the near-field of the AUT, each of the multiple probe elements being positioned at a corresponding one of the multiple known probe locations, wherein the test signals are transmitted from the multiple probe elements within the probe array one probe element at a time.

9. The method of claim 6, wherein:
transmitting test signals toward the AUT from multiple known probe locations includes transmitting the test signals from one or more probe elements associated with an antenna probe assembly in the near-field, wherein the antenna probe assembly is capable of movement within the near-field of the AUT.

10. The method of claim 9, wherein:
the antenna probe assembly includes multiple probe elements arranged in fixed relation to one another; and
the method further comprises moving the multiple probe elements of the antenna probe assembly as a group to a new location in the near-field of the AUT before transmitting test signals to each new antenna element of the AUT that is tested.

11. The method of claim 9, wherein:
the antenna probe assembly includes a single probe element; and
the method further comprises moving the single probe element of the antenna probe assembly to multiple different locations to generate a virtual probe array for each antenna element of the AUT that is tested.

12. The method of claim 1, wherein:
combining the received signals to generate a combined received signal for the first antenna element includes applying complex weights to the received signals so that the signals align substantially in-phase at the first AUT antenna element.

13. The method of claim 1, wherein:
the multiple known probe locations associated with the first AUT antenna element are arranged in a probe array with any of multiple possible separation distances and lattices as needed in order to produce virtual scanned near-field beams at the AUT elements.

14. The method of claim 1, wherein:
the multiple known probe locations associated with the first AUT antenna element are achieved using an antenna probe assembly having a single or multiple probe elements that can be displaced to specific locations in three-dimensional cardinal space.

15. The method of claim 1, wherein:
combining the received signals to generate a combined received signal includes combining the received signals in a fixed hardware beamformer.

16. A system for characterizing an array antenna using near-field measurements, comprising:
a mount to hold an antenna under test (AUT) during testing;
an antenna probe assembly proximate to the mount, the antenna probe assembly being configured to hold one or more probe elements in known locations within a near-field of an AUT in the mount, wherein the antenna probe assembly is capable of controlled movement within the near-field of the AUT;
at least one radio frequency (RF) signal source to provide test signals for transmission between the antenna probe assembly and the AUT during testing; and
a controller coupled to the AUT, the antenna probe assembly, and the at least one RF signal source to perform near-field metrology for the AUT, wherein the controller is configured to:
cause one or more test signals to be transmitted between a first AUT antenna element and multiple known probe locations associated with the probe assembly;
acquire measurements for the first AUT antenna element resulting from the one or more test signals, the measurements including one measurement for each of the multiple known probe locations;
combine the measurements to generate a combined measurement for the first AUT antenna element, wherein the measurements are combined in a manner that decorrelates multipath signals in the combination result;
use the combined measurement to achieve a near-field metrology result for the AUT; and
perform remote boundary condition (RC) testing to reduce or eliminate temporal instability in the calibration test equipment used during the array calibration to isolate temporal instability within the AUT, wherein performing RBC testing includes inserting, first, second and third boundary conditions, one at a time, at a specific point in the calibration test equipment and performing corresponding measurements to establish a phase reference,
wherein the multiple known probe locations associated with the first AUT antenna element lie on one of the following: a plane for planar near-field metrology, a cylindrical surface for cylindrical near-field metrology, and a spherical surface for spherical near-field metrology.

17. The system of claim 16, wherein:
the controller is configured to cause test signals to be transmitted from the multiple known probe locations to the first AUT antenna element one at a time; and
the controller is configured to acquire measurements of resulting received signals at the first AUT antenna element.

18. The system of claim 16, wherein:
the controller is configured to cause the one or more test signals to be transmitted from the first AUT antenna element to the multiple known probe locations; and
the controller is configured to acquire measurements of resulting received signals at the multiple known probe locations.

19. The system of claim 16, wherein:
the controller is configured to cause one or more test signals to be transmitted, acquire measurements, and combine the measurements for some or all of the AUT antenna elements, wherein a different set of probe locations is used for each AUT antenna element tested.

20. The system of claim 19, wherein:
the antenna probe assembly includes a probe array including multiple probe elements held in fixed relation to one another; and
the controller is configured to move the multiple probe elements of the antenna probe assembly as a group to different positions for use with different AUT antenna elements.

21. The system of claim 19, wherein:
the antenna probe assembly includes a single probe element; and
the controller is configured to move the single probe element between different locations for each AUT antenna element tested.

22. The system of claim 16, wherein:
the antenna probe assembly is configured to provide movement of the one or more probe elements within one of the following: a plane in the near-field of the AUT, a cylinder in the near-field of the AUT, and a sphere in the near-field of the AUT.

23. The system of claim 16, wherein:
the controller is configured to combine measurements associated with the first AUT antenna element by applying complex weights to the measurements so that the measurements align substantially in-phase at the first AUT antenna element and summing the weighted measurements.

24. The system of claim 23, wherein:
the controller is configured to dynamically adjust the number of probe locations and the complex weighting factors used to combine the measurements in a manner that minimizes the total scattered error vector magnitude for the multiple AUT antenna elements.

25. The system of claim 16, wherein:
the controller is configured to perform far field pattern calculation for the AUT using near-field metrology.

26. The system of claim 16, wherein:
the controller is configured to calibrate the AUT using near-field metrology.

27. The system of claim 16, wherein:
the AUT includes multiple parallel receive channels and the controller is configured to command some or all of the receive channels to receive in parallel to increase a number of receive AUT elements that can be processed from each probe position and reduce overall data acquisition time.

28. The system of claim 16, wherein:
the probe assembly has multiple parallel receive channels and the controller is configured to command some or all of the receive channels to receive in parallel to reduce overall data acquisition time at each probe position.

29. A method for performing near-field antenna metrology, the method comprising:
for a first antenna element in an antenna under test (AUT):
obtaining a measurement for each of multiple known probe locations in a near-field of the AUT;
combining the measurements to generate a combined measurement for the first antenna element, wherein combining the measurements includes combining the measurements in a manner that de-correlates multipath signals in the combination result;

performing remote boundary condition (RBC) testing to reduce or eliminate temporal instability in the calibration test equipment used during the array calibration to isolate temporal instability within the AUT, wherein performing RBC testing includes inserting first, second and third boundary conditions, one at a time, at a specific point in the calibration test equipment and performing corresponding measurements to establish a phase reference; and using the combined measurement to achieve a near-field metrology result for the AUT, wherein the multiple known probe locations associated with the first AUT antenna element lie on one of the following: a plane for planar near-field metrology, a cylindrical surface for cylindrical near-field metrology and a spherical surface for spherical near-field metrology.

* * * * *